United States Patent [19]

Upton et al.

[11] 4,311,999
[45] Jan. 19, 1982

[54] VIBRATORY SCAN OPTICAL DISPLAY

[75] Inventors: Hubert W. Upton, Arlington; James R. Goodman, Euless, both of Tex.

[73] Assignee: Textron, Inc., Providence, R.I.

[21] Appl. No.: 119,469

[22] Filed: Feb. 7, 1980

[51] Int. Cl.³ .............................................. G06F 3/14
[52] U.S. Cl. .................... 340/755; 340/380; 340/706; 340/407
[58] Field of Search ............... 340/705, 755, 380, 706, 340/407

[56] References Cited

U.S. PATENT DOCUMENTS

| | | | |
|---|---|---|---|
| 2,137,888 | 11/1938 | Fuller | 179/1 R |
| 2,176,167 | 10/1939 | Comstock | 351/50 |
| 2,595,701 | 5/1952 | Rotter | 179/100.3 B |
| 3,436,885 | 4/1969 | Conrose, Sr. | 52/207 |
| 3,463,885 | 8/1969 | Upton | 179/1 R |
| 3,609,235 | 9/1971 | Sawyer | 239/327 |
| 3,803,597 | 4/1974 | Kirner | 340/380 |
| 3,958,235 | 5/1976 | Duffy | 340/755 |

*Primary Examiner*—Marshall M. Curtis
*Attorney, Agent, or Firm*—Richards, Harris & Medlock

[57] ABSTRACT

A raster-type personal display is provided by vibrating an array of fiber optic filaments (32) between display limit (52, 54) by means of an electromechanical exciter (36). One end of the fiber optic filaments (32) is cantilever mounted to an array of light emitting diodes (34), with the second end of the filaments free to be vibrated by the exciter (36). Drive signals for energizing the light emitting diodes (34) are generated by a symbol generator (38) that receives synchronization pulses from a position detector consisting of a light source (58), a shutter (56) and a light responsive pickup (60).

17 Claims, 7 Drawing Figures

VIBRATORY SCAN OPTICAL DISPLAY

TECHNICAL FIELD

This invention relates to a raster-type personal display system, and more particularly to a vibrating fiber optic display for presenting information to an observer by means of a mirror mounted in the observer's field of view.

BACKGROUND ART

Heretofore, most systems for providing pictorial information within the view of an observer required relatively large and bulky equipment. Typical of such early systems are those utilizing a cathode ray tube with the information displayed thereon transmitted to an observer by means of a partial reflective surface positioned within the normal viewing field of the observer. One such system is described in U.S. Pat. No. 3,666,887 issued to Michael H. Freeman. With early personal display devices where a fixed composite display was presented, there was required a restricted movement of the observer's head thereby restricting vision of the environment to one direction. These types of systems, in addition to being expensive and bulky, restricts the observer's normal binocular vision and limits the viewing of the surroundings to one direction.

Another implementation of a system for superimposing an image on the normal background environment of an observer utilized a miniaturized cathode ray tube supported on the side of the observer's head with the display image reflected to the observer by means of corrective or plain lenses of conventional eyewear. The observer sees a picture from the cathode ray tube, as well as being able to see normally through lenses of the conventional eyewear.

Although there are many applications which require an observer to scan a screen displaying pictorial information, which may be constantly changing, in addition to maintaining continual visual awareness of the normal surroundings, the invention herein claimed will be described with emphasis directed to a vehicle operator as the observer. For example, in many situations the pilot of an aircraft must maintain visual awareness of conditions surrounding the aircraft in addition to viewing a display showing attitude or altitude of the aircraft.

When flying an aircraft at very low altitudes, where conditions change rapidly, the pilot cannot give sufficient attention to both the surrounding environment and visual displays if he is required to move his head to view the surrounding environment and the displays. Normally it takes several seconds for the pilot's eyes to refocus from the relatively short distances encountered when viewing the displays and the relatively long distances when viewing surrounding environment. The result is that the observer (pilot of an aircraft) is unable to give the required full attention to the displays and the surrounding environment.

Although the invention will be described with reference to operation of an aircraft by a pilot, it should be understood that the invention also finds utility in speech interpretation assistance as part of a device as described in U.S. Pat. No. 3,936,605. The utility for the device such as described in U.S. Pat. No. 3,936,605 for speech interpretation assistance is set out in U.S. Pat. No. 3,463,885.

DISCLOSURE OF INVENTION

In accordance with the present invention, a raster-type personal display system includes a plurality of light sources energized in a pattern to convey desired information visually. Light from these sources is input to an array of fiber optic filaments having one end positioned to receive light from the sources and a second end free to translate within fixed display limits. A vibrating motion is imparted to the second end of the fiber optic filaments such that they move within the fixed display limits to produce a two dimensional display.

The two dimensional display is seen by an observer while viewing environmental surroundings through the lens of conventional eyewear that includes a mirrored surface positioned with respect to the eye of the observer. Information images produced on the two dimensional display are visible to the observer via the mirror. The display system is positioned at a location at about the focal plane of the mirror so an image appears at the desired angle in the observers field of view. The mirrored surface may be adhered to the lens of conventional eyewear or may be ground into the lens.

In accordance with the present invention, the information image on the two dimensional display may be symbolic or may be more detailed as desired. Signals for driving the light sources in the desired pattern are generated by a microprocessor programmed to provide a variety of dynamic signals such as fixed/moving dots, artificial horizon lines, circles, lines or many other geometric symbols.

BRIEF DESCRIPTION OF THE DRAWINGS

For a more complete understanding of the present invention and the advantages thereof, reference may now be had to the following description taken in conjunction with the accompanying drawings.

Referring to the drawings.

DETAILED DESCRIPTION

The display system of the present invention provides what has been identified in the art as a "Head-Up Display" and serves in conjunction with an optical system to superimpose visual information on the field of view of an observer. The observer can simultaneously view the surrounding environment and see visual information without having to change his direction of view, in particular, without having to lower his head. Further, the apparatus of the present invention allows the observer to freely rotate his head and the visual display follows such movement.

Figure 1:
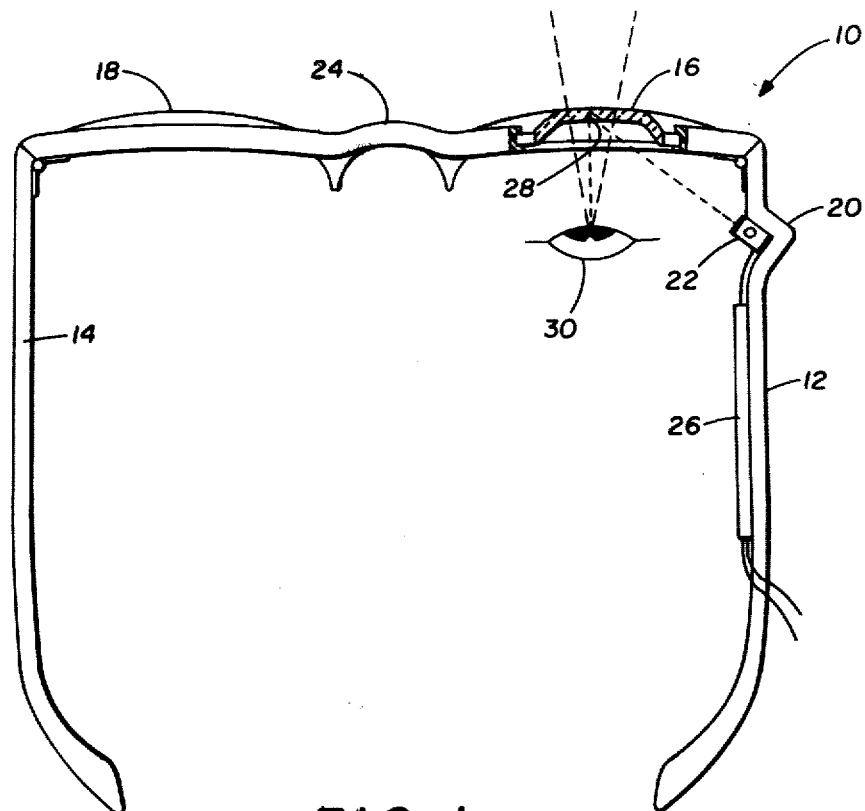
FIG. 1 illustrates a plan view wherein the invention is attached to eyeglasses worn by the observer with a mirrored surface ground into the eyeglass lens.

Referring to FIG. 1, a lens bearing frame 10 of a pair of eyeglasses is hinged to ear pieces 12 and 14 for positioning by a wearer such that the observations may be made of objects through lenses 16 and 18 in a conventional manner. Also conventional is the ear piece 14. The embodiment of the invention as illustrated in FIG. 1 is mounted in the ear piece 12 that is modified to include a dogleg 20 supporting a display system 22 of the present invention. The lens bearing frame 10 is coupled to the ear pieces 12 and 14 in a conventional manner and the usual nose rest 24 bridges the frame elements mounting lenses 16 and 18.

As illustrated, the display system 22 is secured to the ear piece 12 out of view of the wearer and is excited from an electronics module 26 secured to the inner surface of the ear piece 12. The electronics module 26 provides drive signals for exciting the display system 22 to produce the desired information to the observer or wearer of the frame 10.

The lens 16 of the frame 10 is provided with a recessed mirrored surface 28 such that the wearer when looking through the lens may also bring into vision the information on the display system 22. Alternatively, the mirrored surface may be a section of a spherical configuration and cemented or otherwise attached to a conventional lens.

Thus there is provided by the apparatus of FIG. 1 a support for superimposing in a substantially fixed relationship to the head of an observer information visually presented by the display system 22. By this arrangement changes in orientation of the observer's head will not produce changes in orientation of the superimposing display inasmuch as the eyeglasses rotate or move with the observer.

Figure 2:
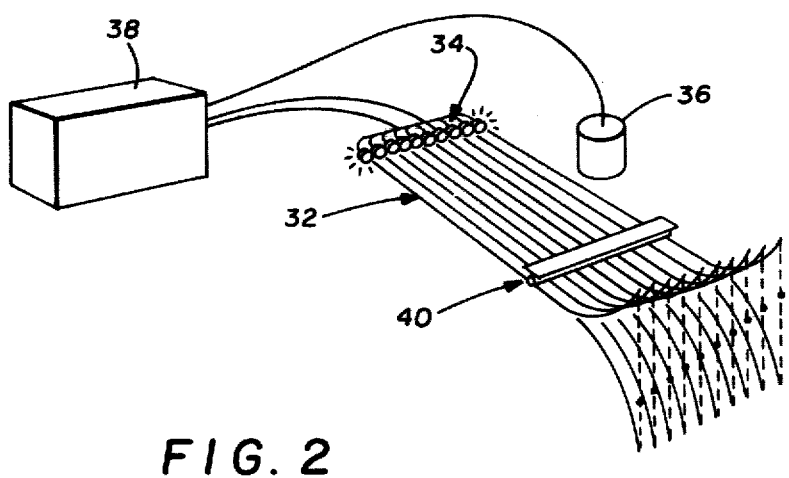
FIG. 2 is a pictorial representation of the fiber optic display of the present invention wherein multiple fibers are vibrated by an electromechanical exciter and light sources are driven by a symbol generator.

Referring to FIG. 2, the display system 22 consists of a linear array of fiber optic filaments 32 with visible light emitting diodes 34 attached to one end of the filaments. The second end of the filaments are free to translate in vibration produced by an electromechanical exciter 36 over a finite distance defined by fixed display limits. The light emitting diodes 34 are pulsed at the appropriate time to provide any desired pattern by signals generated in a microprocessor symbol generator 38. Vibration of the fiber optic filaments 32 is achieved by exciting the electromechanical exciter 36 with a drive signal from the symbol generator 38. The electromechanical exciter 36 functions in conjunction with a T-bar 40 of a magnetizable material that is adhered to the fiber optic array of filaments in a direction transverse of the filament direction.

The visual presentation provided by the display system 22 as illustrated in FIG. 2 is created by forming dynamic light patterns on the ends of the linear array of fiber optic filaments 32 as vibrated by the exciter 36. The vibrating fibers form a scan line similar to the raster-type scan of a television tube. By pulsing the light emitting diodes 34 with drive signals from the symbol generator 38 dots are formed on the scan line and images are formed on the slightly curved plane formed by movement of the second end of the vibrating fibers.

By energizing the electromechanical exciter 36 with a frequency above the flicker frequency of the eye, and updating the image on each scan, dynamic images are formed very much as they are formed on a conventional television screen.

Figure 3:
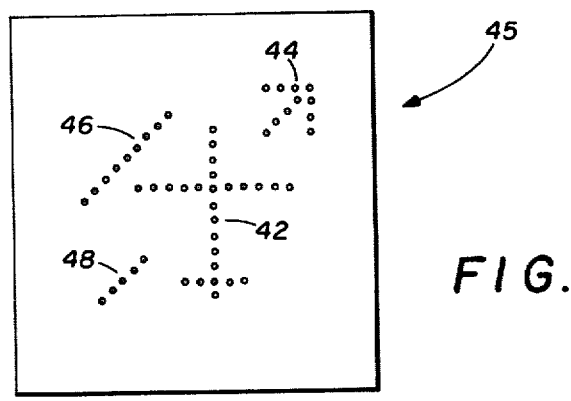
FIG. 3 is an illustration of one two dimensional display that typically is provided by the raster-type scanning display system of FIG. 2.

A typical display 45 that will be visible at the ends of the fiber optic filaments 32 is illustrated in FIG. 3. In the display 45, the aircraft symbol 42 is approximately centered in the display and created by a series of dots resulting from the excitation of selected ones of the light emitting diodes 34. The dots forming the patterns represent a typical dynamic display and represents an aircraft flight path. The display 45 also shows the aircraft intercepting a desired flight path at an angle. This display, as generated at the ends of the fiber optic filaments 32, is reflected by the mirror 28 to the eye of a pilot wearing the frame 10. This enables the pilot to not only observe the direction of his aircraft as it is approaching a desired flight path, but also to view the surrounding environment. Thus, the image of FIG. 3 is superimposed on the normal background image and may be simultaneously viewed by a pilot.

When the invention is utilized for speech interpretation assistance it provides a deaf person the unique possibility of seeing sounds. Thus, in conjunction with the optical system of U.S. Pat. No. 3,936,605, the invention provides a unique and meaningful display to the user representing characteristics of speech. The patterns presented at the ends of the fiber optic filaments 32 are selected to provide visual assistance to a deaf person for understanding sounds.

Figure 4:
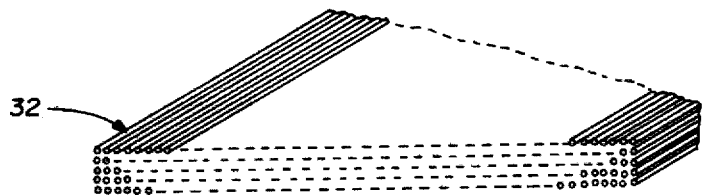
FIG. 4 is a pictorial view, partially cut away, showing the free end of the array of fiber optic filaments of FIG. 2.

Referring to FIG. 4, the linear array of fiber optic filaments 32 comprises a matrix of filaments bonded together in a lightweight flat ribbon configuration. Typically, each of the fiber optic filaments is 0.004 inches in diameter and in one model there were five rows of such filaments extending across the width of the flat ribbon. Thus, the thickness of the ribbon was approximately 0.02 inches and sufficient numbers of filaments are arranged in columns to produce a ribbon width of 0.375 inches. The display is then 0.375 inches wide. In a model of the display system 22 the fiber optic filaments were obtained from American Optical Company.

Figure 5:
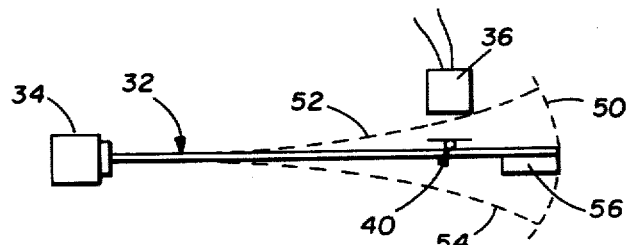
FIG. 5 illustrates a side view of the array of fiber optic filaments terminating in a cantilever mount to a light source at one end and free to vibrate at a second end by means of an electromechanical exciter.

With reference to FIG. 5, the fiber optic array of FIG. 4 is illustrated with one end cantilever mounted to the light emitting diode array 34 with the second end free to translate in an arc as identified by the line 50 between display limits as illustrated by the lines 52 and 54. With a ribbon width of 0.375 inches for the fiber optic filaments 32, the display limits are set to provide a 0.375 inch travel for the second or free end. For a display having dimensions of 0.375 inches by 0.375 inches, the light emitting diode array 34 will contain 64 diodes of a model available from Texas Instruments.

Figure 6:
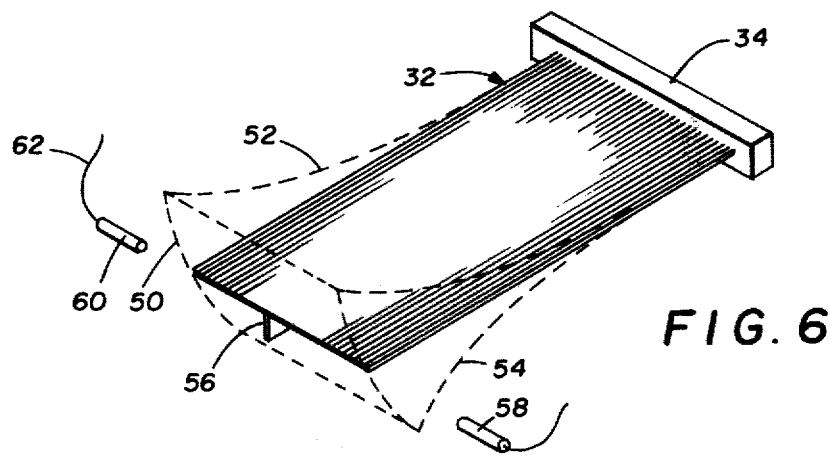
FIG. 6 is a pictorial view showing a detector for generating synchronization signals related to the position of the second end of the fiber optic filaments.

Referring to FIG. 6, the position of the vibrating flat ribbon of fiber optic filaments 32 is detected by movement of a shutter 56 mounted perpendicular to the plane of the ribbon and extending downward therefrom. This shutter interrupts a light beam from a light source 58, such as a light emitting diode, to a light responsive pickup 60, such as a light responsive semiconductor device. As the shutter 56 moves between the source 58 and the pickup 60, interruption of the light beam generates a synchronization signal on a line 62 which is applied to the symbol generator 38 as will be described. Thus, each time the fiber optic filaments pass a given location in their vibratory motion a pulse is generated on the line 62.

Figure 7:
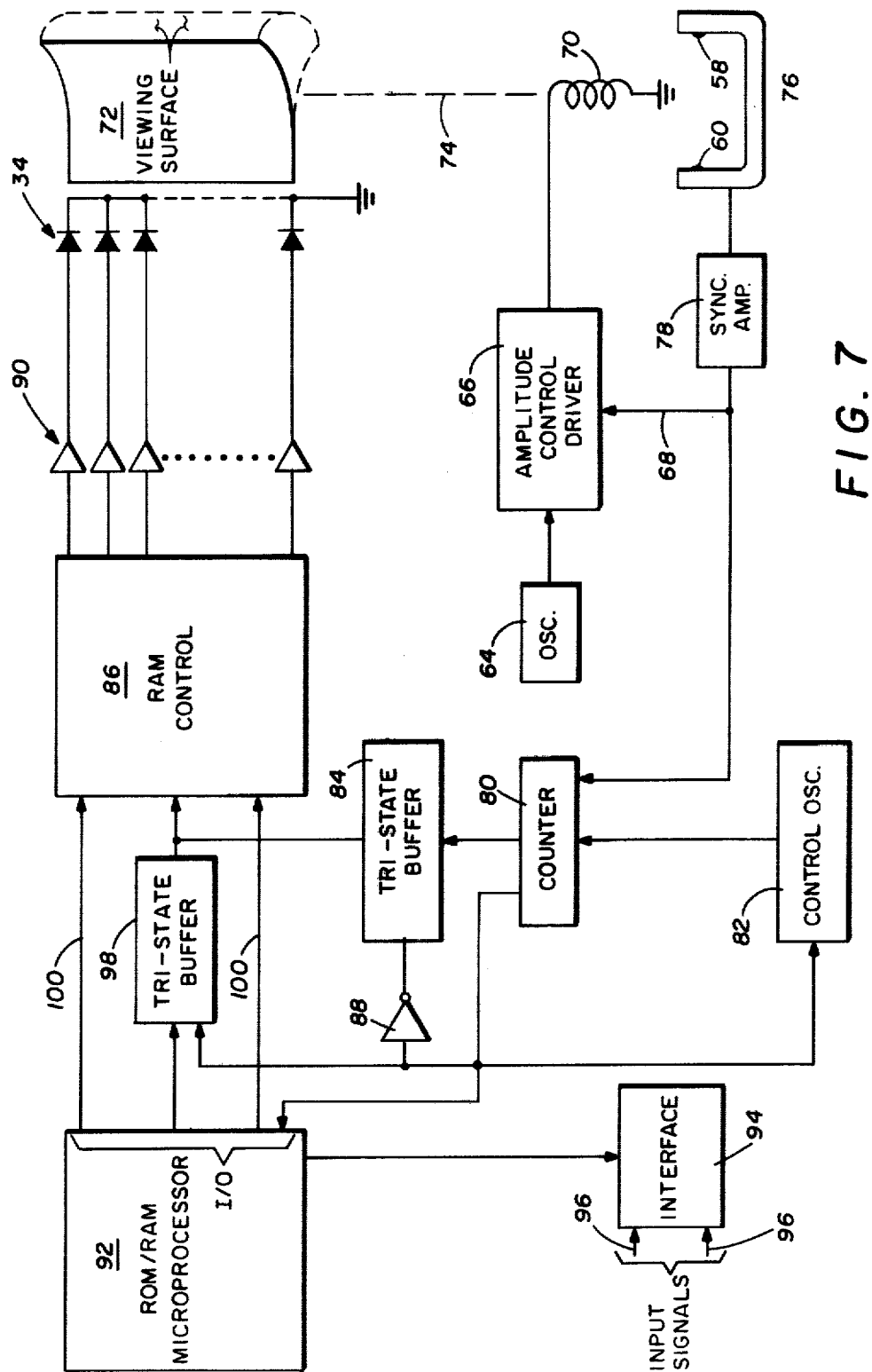
FIG. 7 is a block diagram of the symbol generator of FIG. 1.

Referring to FIG. 7, there is shown a block diagram of the symbol generator 38 where an astable multivibrator 64 generates a signal at a frequency to vibrate the fiber optic filaments 32 above the flicker frequency of the eye with the output of the multivibrator applied to an input control and driver amplifier 66. The amplifier 66 also receives a synchronization feedback signal on a line 68.

The output of the amplitude control and driver amplifier 66 is coupled to a coil 70 as part of the electromechanical exciter 36. The coil 70 is shown coupled to the viewing surface 72 by means of a dotted line 74. The viewing surface 72 represents the array of the fiber optic filaments 32 and the line 74 illustrates the T-bar 40 mounted transversely to the fiber optic array. The output of the amplifier 66 drives the coil 70 at or near the resonant frequency of the moving fiber optic material which is shown in FIGS. 2, 5 and 6 cantilevered from the surface of the light emitting diode array 34. A sensor 76 that includes the light source 58 and the light responsive pickup 60 detects a reference position of the moving fibers by means of the shutter 56. This position signal enables synchronization of the output of the amplifier 66 with movement of the fiber optic filaments 32. This synchronization signal is output from a sync amplifier 78 coupled to the light responsive pickup 60.

Also coupled to the output of the sync amplifier 78 is a counter 80 for synchronizing the generation of display signals with the position of the fiber optic filaments 32. To drive the counter 80 the output of an astable multivibrator 82 is connected to the counter which then produces address signals. These address signals are input to a tri-state buffer 84 that, in turn, generates an output applied to a random access memory 86. The buffer 84 couples the address signals to the random access memory 86 when enabled by the output of inverter amplifier 88 having an input coupled to the output of the counter 80. This operation enables addressing of the random access memory 86 to provide drive signals to the light emitting diodes of the array 34 through buffer amplifiers 90.

When the counter 80 reaches the end of its output cycle, the multivibrator 82 is disabled and remains idle until the counter is reset by the synchronization pulse from the sync amplifier 78. Upon the application of a synchronization pulse to the counter 80 the multivibrator 82 is again enabled to provide another display cycle.

A signal from the counter 80 that disenables the multivibrator 82 is also applied to a microprocessor 92 in the form of an interrupt command. This interrupt command informs the microprocessor that one sweep of the display, that is, one translatory motion of the second end of the fiber optic filaments 32 between the limits 52 and 54, has been completed.

The microprocessor 92 receives information as to the desired display from interface logic 94 that receives input signals over lines 96. These input signals are applied to the microprocessor 92 that responds by selecting the desired display information from the various displays available for selection and stored in the microprocessor.

Typically, the microprocessor 92 is an INTEL 8085 model that includes a read only memory, a random access memory and input/output logic. The microprocessor performs such functions as input interface control and processing, data calculation and manipulation, data formatting for the random access memory 86, random access memory control, addressing and loading, synchronization of the random access memory 86, loading by means of interrupt sensing, and control of the integral random access memory, a read only memory and also the input/output function.

The microprocessor 92 after receiving an interrupt command from the counter 80 controls the address lines of the random access memory 86 through a tri-state buffer 98. Thus, the random access memory 86 receives address information over control lines from both the buffer 84 and the buffer 98. Also interconnecting the microprocessor 92 and the random access memory 86 are required data lines 100.

In operation of the symbol generator of FIG. 7, upon generation of each synchronization pulse from the amplifier 78 a new display scan is initiated. The amplitude and control driver 66 deflects the fiber optic filaments 32 in the direction of the display limit line 52 to start the scan. This same synchronization pulse from the amplifier 78 resets the counter 80 which then starts another count sequence to address the random access memory 86 to generate display signals applied through the buffer amplifiers 90 to the light emitting diodes 34. As the fiber optic filaments 32 vibrate from the upper display limit line 52 to the lower display limit line 54 signals are sequentially supplied to the light emitting diodes 34 from the random access memory 86. At the end of the scan cycle, the multivibrator 82 is disenabled and an interrupt command is applied to the microprocessor 92. The microprocessor 92 then formats new address information for the random access memory 86 that is transferred through the tri-state buffer 98 under control of the microprocessor 92. This address information identifies the pattern of control signals that will be applied to the light emitting diodes 34 when the next synchronization pulse resets the counter 80.

Having described the invention in connection with a specific embodiment thereof, it is to be understood that modifications may now suggest themselves to those skilled in the art and it is intended to cover such modifications as fall within the scope of the claims.

We claim:

1. A raster-type personal display system for providing an image of displayed information in the field of view of an observer, comprising:
   means for mounting a mirror in the field of view of an observer,
   a plurality of light sources,
   an array of fiber optic filaments mounted in a cantilever arrangement and each having one end in a fixed position to receive light from said sources and a second end positioned to be visible to an observer by the mirror and free to translate within fixed display limits,
   means for imparting a vibrating motion to the second end of said fiber optic filaments within the fixed display limits to produce a two dimensional display reflected from the mirror to the observer, and
   means responsive to drive signals to energize said plurality of light sources in a pattern to display desired information at the vibrating second end of said fiber optic filaments.

2. A raster-type personal display system as set forth in claim 1 wherein each of said plurality of light sources comprises a light emitting diode.

3. A raster-type personal display system as set forth in claim 2 wherein said plurality of light sources is arranged in a linear array.

4. A raster-type personal display system as set forth in claim 3 wherein said fiber optic filaments are formed into a flat ribbon positioned in a direction to be in alignment with the linear array of said light sources.

5. A raster-type personal display system as set forth in claim 1 wherein the one end of each of the fiber optic filaments is cantilever mounted and in contact with said plurality of light sources.

6. A raster-type personal display system as set forth in claim 1 wherein said means for imparting a vibrating motion includes a bar of ferrous material attached transverse of the fiber optic filaments between the one end and the second end, and an electromagnet positioned to magnetically attract said bar when energized.

7. A raster-type personal display system as set forth in claim 6 wherein said electromagnet is energized at a frequency above the flicker frequency to impart the desired vibrating motion to the second end of said fiber optic filaments.

8. A raster-type personal display system for displaying information to an observer by means of a mirror mounted in the field of view of the observer, comprising:
 a plurality of light sources,
 drive means responsive to input signals to energize said light sources in a pattern to convey the desired information,
 an array of flexible fiber optic filaments each having one end fixedly mounted in a position to receive light from said sources and a second end free to translate within fixed display limits from an equilibrium position,
 means for imparting a vibrating motion to the second end of said fiber optic filaments within the fixed display limits to provide a two dimensional image reflected from the mirror to the observer, and
 means for detecting the position of the second end of said fiber optic filaments to generate a synchronization signal to said drive means and said means for imparting a vibratory motion.

9. A raster-type personal display system as set forth in claim 8 wherein said means for detecting includes a shutter attached to said array of fiber optic filaments,
 a light source generating a beam of light to said shutter in one position thereof, and
 light responsive means receiving light from said source when the shutter is displaced from its one position, said light responsive means generating the synchronization signal.

10. A raster-type personal display system as set forth in claim 9 wherein said plurality of light sources is arranged in a linear array.

11. A raster-type personal display system as set forth in claim 10 wherein said array of fiber optic filaments forms a flat ribbon with the one end positioned to receive light from the linear array of said light sources.

12. A raster-type personal display system as set forth in claim 11 wherein said means for imparting a vibrating motion includes:
 a bar of magnetizable material attached transversely to the array of fiber optic filaments between the one end and the second end, and
 an electromagnet positioned to impart vibrating motion to said bar thereby vibrating the second end of said fiber optic filaments within the fixed display limits.

13. A raster-type personal display system for providing an image of displayed information in the field of view of an observer, comprising:
 binocular vision means to be worn by an observer and including lenses through which objects are observed in a conventional manner,
 a mirror mounted in one of said lenses in the field of view of an observer,
 a plurality of light sources,
 an array of fiber optic filaments having one end mounted to said binocular vision means, each filament positioned to receive light from said light sources and a second end positioned to be viewed by an observer through said mirror, and
 means for imparting a vibrating motion to the second end of said fiber optic filaments to produce a two-dimensional display reflected from the mirror to the observer.

14. A raster-type personal display system as set forth in claim 13 wherein said mirror covers only a portion of said one lens.

15. A raster-type personal display system as set forth in claim 13 including means for generating drive signals to energize said plurality of light sources in a pattern to display desired information at the vibrating second end of said fiber optic filaments.

16. A raster-type personal display system as set forth in claim 13 wherein said fiber optic filaments are cantilevered mounted to said binocular vision means.

17. A raster-type personal display system as set forth in claim 13 including means for synchronizing the energization of said light sources with the position of the vibrating optic fiber filaments.

* * * * *